(12) United States Patent
Nethercot et al.

(10) Patent No.: US 12,556,359 B2
(45) Date of Patent: Feb. 17, 2026

(54) SYSTEMS AND METHODS FOR MANAGING CHANNEL ACCESSIBILITY

(71) Applicant: Xilinx, Inc., San Jose, CA (US)

(72) Inventors: Mark Richard Nethercot, Edinburgh (GB); Martin Rhodes, Edinburgh (GB); David Riddoch, Cambridge (GB); Connor Hughes, Edinburgh (GB); Gareth David Edwards, Edinburgh (GB)

(73) Assignee: Xilinx, Inc., San Jose, CA (US)

( * ) Notice: Subject to any disclaimer, the term of this patent is extended or adjusted under 35 U.S.C. 154(b) by 171 days.

(21) Appl. No.: 18/345,792

(22) Filed: Jun. 30, 2023

(65) Prior Publication Data
US 2025/0007684 A1 Jan. 2, 2025

(51) Int. Cl.
*H04L 7/00* (2006.01)
(52) U.S. Cl.
CPC .................. *H04L 7/0041* (2013.01)
(58) Field of Classification Search
CPC .................................................. H04L 7/0041

USPC ................................ 375/354, 219, 295, 316
See application file for complete search history.

(56) References Cited

U.S. PATENT DOCUMENTS

2022/0335168 A1* 10/2022 Venås ................. G06F 13/4286
2024/0103561 A1* 3/2024 Pang .................... G06F 1/3237

* cited by examiner

*Primary Examiner* — Zewdu A Kassa
(74) *Attorney, Agent, or Firm* — Greenberg Traurig, LLP

(57) ABSTRACT

A computer-implemented method for managing channel accessibility can include detecting, by a first circuit, a transmit request from the first circuit to transmit a message into a communication channel connecting the first circuit to second circuit. The method can include determining, by the first circuit, whether to approve the transmit request based on an evaluation of a first number associated with messages previously transmitted by the first circuit to the second circuit over the communication channel and a second number associated with processing by the second circuit of the messages previously transmitted by the first circuit. The method can include, in response to determining to approve the transmit request, transmitting, by the first circuit, the message into the communication channel. Various other methods, systems, and computer-readable media are also disclosed.

20 Claims, 10 Drawing Sheets

SYSTEMS AND METHODS FOR MANAGING CHANNEL ACCESSIBILITY

BACKGROUND

Large-scale communication between or within integrated circuits such as systems-on-a-chip can include communication between circuits operating at different clock frequencies. Clock domain crossing can involve handshaking or translations to try to address risks of communication errors.

BRIEF DESCRIPTION OF THE DRAWINGS

The accompanying drawings illustrate several example implementations and are a part of the specification. Together with the following description, these drawings demonstrate and explain various principles of the present disclosure.

Figure 1:
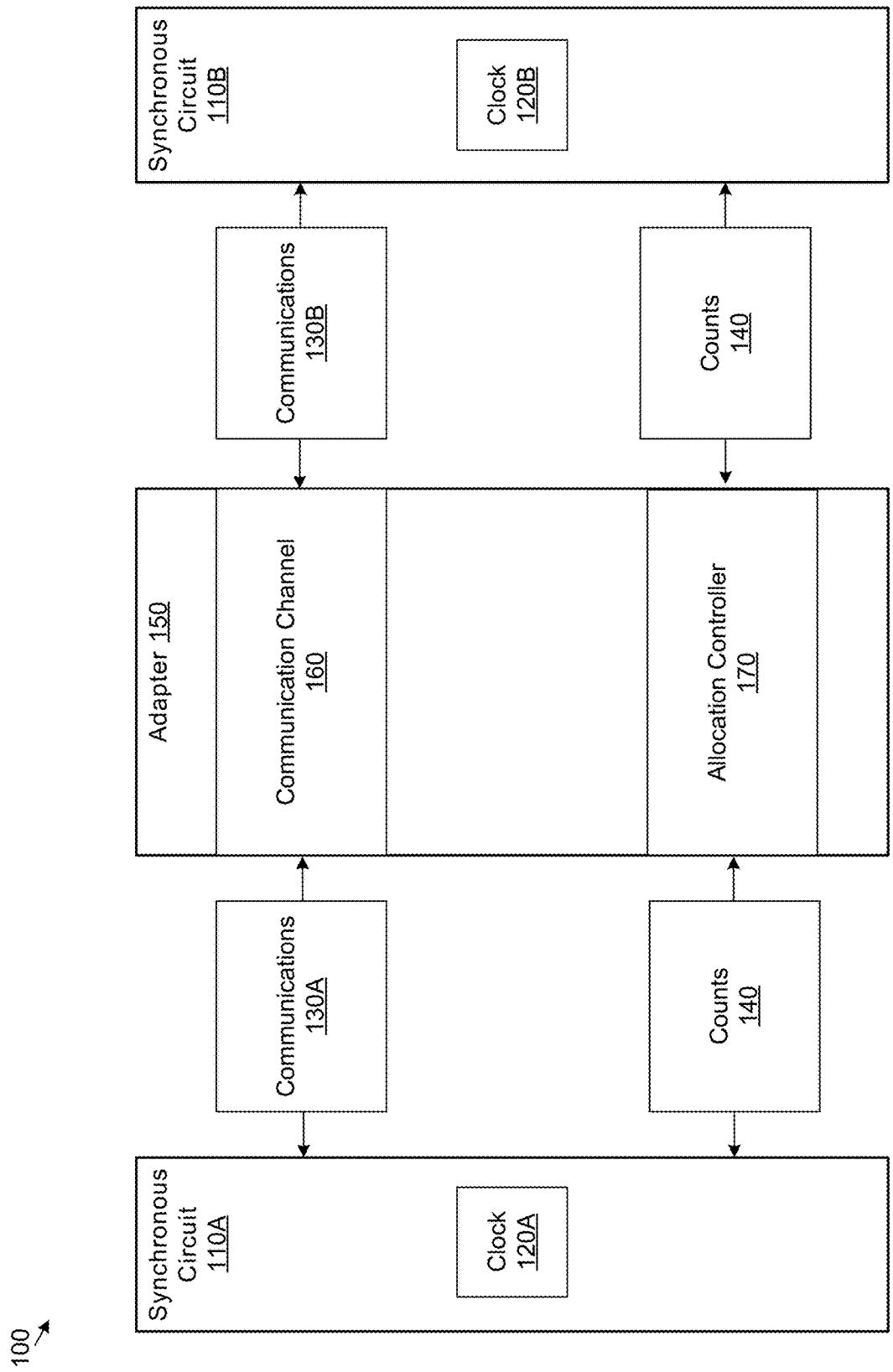
FIG. 1 is a block diagram of an example system for managing channel accessibility.

Throughout the drawings, identical reference characters and descriptions indicate similar, but not necessarily identical, elements. While the example implementations described herein are susceptible to various modifications and alternative forms, specific implementations have been shown by way of example in the drawings and will be described in detail herein. However, the example implementations described herein are not intended to be limited to the forms disclosed. Rather, the present disclosure covers all modifications, equivalents, and alternatives falling within the scope of the appended claims.

DETAILED DESCRIPTION

Described herein are examples of systems and methods for managing channel accessibility. In some implementations described herein, one or more numbers can be maintained (e.g., in a register) and used to manage whether a write request for a channel will be approved. For example, a request may indicate that one or more messages are to be written between a first circuit and a second circuit over the channel communicatively coupling the first and second circuits, and the number(s) may be modified based on the request, such as, in some cases, based on the number of messages to be written. The request may be approved or denied based on the number(s). Such numbers can, in some implementations, reflect a number of messages written from the first circuit to the second circuit over time and a number of received messages processed by the second circuit over time, which can in some cases indicate a capacity of the second circuit at a time to receive more messages. Examples of ways in which the number(s) may be maintained and in which the number(s) may be used to manage whether to approve or deny a request are described below. For example, in some implementations, when a message is to be transmitted from the first circuit to the second circuit, a number of messages transmitted from the first circuit to the second circuit may be incremented. In some such implementations, that incremented count may be used in connection with a number of received messages processed by the second circuit over time to determine whether the second circuit has available capacity to receive the message to be transmitted. If so, the message may be transmitted. When the second circuit processes received message(s), in some implementations, a number of messages received over time may be incremented by the second circuit. The number of messages processed by the second circuit may be exchanged from the second circuit to the first circuit. In some implementations, if a message is to be transmitted over multiple clock cycles or if otherwise received in multiple parts, a number of messages may be the number of clock cycles or number of parts associated with transmission of the message.

Some implementations described herein can be useful in a circuit that includes include exchanging commands (e.g., data to be transferred) between circuits with different clock rates (e.g., asynchronous circuits) and/or across channels having different bit widths. Some implementations described herein include an adapter that can convert a command from a smaller bit width (e.g., 128-bits) to a wider bit width (e.g., 256-bits), or a wider bit width (e.g., 256-bits) to a smaller bit width (e.g., 128-bits). To manage the allocation of the commands during the conversion while a command arrives from a circuit operating at one frequency (e.g., 433 MHZ) and is received by a circuit operating at a different frequency (e.g., 1 GHZ), some implementations described herein include an allocation controller to monitor the reading and writing of the commands into the channels. The allocation controller can be modified based on the reads and writes in the channels, which enables tracking of the data availability of the channels to reduce a risk of overflow.

In command transmissions between integrated circuits, issues can arise when the circuits do not have the same clock rate and/or do not have the same bus width. For example, one circuit (e.g., fabric) can operate with a slower clock frequency (e.g., 433 MHZ) and transmit commands along a wider channel (e.g., 256-bits) to another circuit (e.g., data processing unit) operating at a faster clock frequency (e.g., 1 GHZ) with a smaller channel (e.g., 128-bits). Clock domain crossing to transfer commands between circuits with different timing and/or bus widths is a difficult operation because after the transfer, the data within the commands might not be aligned and thus in some cases might not be usable.

Attempts have previously been made at transferring commands between such circuits across a bus, but the inventors have recognized and appreciated that prior solutions necessitated additional functional logic that led to inefficiencies in design and operation of the transfer. For example, some prior solutions required modifying the packets and then additional verification steps, which can be slow and still cannot guarantee that the packets are not corrupted during the modifications. Moreover, the inventors realized and appreciated that prior solutions could cause the bus between the two asynchronous circuits to overflow during the transfer of the data. Prior solutions have attempted to constantly monitor the bus utilization to avoid overflows, such as by relying on handshaking and acknowledgments, but the inventors realized that such approaches are fundamentally inefficient by requiring at least two additional clock cycles before each data transfer.

Described herein are techniques that can efficiently transfer messages (e.g., commands) between circuits, which can in some cases have different clock rates (e.g., asynchronous) and/or different bus widths. An adapter can perform domain crossing between the circuits, and the adapter can include a first-in-first-out (FIFO) buffer queues for facilitating bus width conversion to transfer the messages between the circuits. Different implementations of the adapter can convert the messages depending on the direction of the transfer between the circuits.

In one implementation, the adapter is an ingress adapter that transfers messages transmitted over a wide channel (e.g., 256-bits) from a circuit having a slow clock frequency (e.g., 433 MHz) to another circuit having a fast clock frequency (e.g., 1 GHz) with a smaller channel (e.g., 128-bits). In another implementation, the adapter is an egress adapter that transfers commands transmitted over a smaller channel (e.g., 128-bits) from a circuit having a fast clock frequency (e.g., 1 GHZ) to another circuit having a slow clock frequency (e.g., 433 MHZ) with a wider channel (e.g., 256-bits). Each implementation of the adapter can be set to a conversion mode depending on the number of channels in the adapter and the bit widths to be converted. A single width mode can cause the adapters to convert between 256-bits and 128-bits. A dual width mode included in some implementations can cause the adapters to convert between 256-bits and 512-bits. A quad width mode included in some implementations can cause the adapters to convert between 512-bits and 1024-bits. For example, the adapter can include registers that can be set to select the conversion mode.

In some implementations, some techniques described herein can track the processing of messages (e.g., reads and writes) on the channels while transferring data between the asynchronous circuits and reduce a risk of bus overflows. The inventors have realized that by tracking the access requests, the data can be transferred faster than existing approaches such as translating the packets or handshaking between asynchronous circuits (e.g., one sends data access request, and another sends acknowledgement that data access can proceed) before exchanging commands. For example, the techniques described herein can include tracking the access requests during a single clock cycle whereas the translations and handshaking can take multiple clock cycles. By reducing the number of clock cycles, the inventors have appreciated that the techniques described herein allow for faster and easier data transfer between circuits operating at different clock speeds while consuming less power.

In some implementations, the adapters described herein can include an allocation controller that includes and/or facilitates management of one or more counters (e.g., registers) corresponding to available clock cycles for processing messages of the channel between circuits. In some implementations, in each clock cycle the data transmitted over the interface may be placed into storage on the receive side of the interview, with each clock cycle corresponding to a unit of storage. A count of clock cycles over which a transmission is made can thus correspond to a number of units of storage occupied by transmissions. For example, a counter can be an 8-bit counter can in some implementations initially be set active high to 255 (e.g., 1111-1111) to represent 256 clock cycles of communication to be exchanged over the interface. When a message (or a part of a message) is transmitted over the interface, a counter can be incremented to indicate that a unit of storage has been occupied. For example, the allocation controller can increment a local counter for access requests to write a command (or another message) over the channel. A counter can also be incremented when a unit of storage on the receive side of the interface has been processed, such as moving the received data (e.g., the message, or a part of a message) to another recipient in a communication or processing path or otherwise processing the data. When messages are processed, in some implementations, a counter of processed transmissions can be incremented. For example, the allocation controller can increment a processed message counter for messages that are processed by the circuit receiving commands (or other messages) over the channel.

The counter of processed transmissions can, in some cases, be sent over the interface to the transmitter of the messages. In some implementations, the allocation controller and the counters may be accessible via an application programming interface (API). A difference between the counters can indicate an available capacity of the interface to receive transmitted data. To prevent the channel from overflowing, the adapter can allow messages to be transmitted over the channel unless a number of transmits (e.g., clock cycles, message parts, etc.) is greater than a threshold, where that threshold may be related to a capacity of the receiving circuit to receive messages over the channel at a time. For example, the adapter can allow transmissions via the channel unless a number of transmits needed for a message is more than a difference between the number of processed messages and the number of transmitted messages. This can be done using binary subtraction in some implementations, where the number of transmitted messages and number of processed received messages are maintained as fixed-width binary numbers that are incremented (with each transmit and with each processing, respectively), including by incrementing through a rollover of the binary value. By maintaining two counts that are each incremented, in some such implementations the receive capacity of the receiving circuit can be determined using binary subtraction. It should be appreciated, however, that implementations are not limited to using this technique, as others are possible. Other illustrative techniques are described below.

In some implementations, the adapter supports transferring commands across multiple channels. Each channel can be allocated a channel specific memory allocation from the system memory allocation. However, the inventors have realized that any of the channels can temporarily be allocated some of this system memory allocation to leverage additional bandwidth across which the commands can be transferred. This additional system memory allocation can be a reserve to provide additional bandwidth beyond the ones allocated to the specific channel. For example, if a channel is allocated 64 clock cycles but the system has 256 clock cycles in the expanded memory, then some of those 256 clock cycles can be temporarily utilized by any of the channels for additional bandwidth.

To reduce the risk of overflowing the system memory allocation while still efficiently utilizing the channel specific memory allocation, in some implementations the allocation controller can track the communication-specific allocation and the system memory allocation. For example, the allocation controller can track a 64-bit counter for 64 clock cycles of the communication-specific allocation and a 256-bit counter for the 256 clock cycles of the system memory allocation. If the system memory allocation has more available memory than the channel specific memory allocation (e.g., more than 64 of the 256-bits of system memory are available when the channel is allocated 64-bits), then the allocation controller can count clock cycles as available to the channel until their consumption by a transmission. After the system memory allocation has fewer available bits than the channel's allocation (e.g., less than 64 of the 256-bits are available when the channel is allocated 64-bits), the allocation controller can count transmission clock cycles as available to the channel only when the clock cycle is released by a read. After the system memory allocation again has more clock cycles available than the channel allocation, then the allocation controller can again count clock cycles as available until they are consumed by a transmission.

As will be described in greater detail below, the present disclosure describes various systems and methods for managing channel accessibility.

In some implementations, the techniques described herein relate to a computer-implemented method for managing channel accessibility, the computer-implemented method including: detecting, by a first circuit, a transmit request from the first circuit to transmit a message into a communication channel connecting the first circuit to a second circuit; and transmitting, by the first circuit, the message into the communication channel based on an evaluation of a first number associated with messages previously transmitted by the first circuit to the second circuit over the communication channel and a second number associated with processing by the second circuit of the messages previously transmitted by the first circuit.

In some implementations, the techniques described herein relate to a computer-implemented method, wherein the first number and the second number are binary values, and wherein the evaluation includes subtracting the first number from the second number.

In some implementations, the techniques described herein relate to a computer-implemented method, wherein the message is to be transmitted into the communication channel over a third number of clock cycles, and wherein the evaluation includes comparing the third number of clock cycles to a difference between the first number and the second number.

In some implementations, the techniques described herein relate to a computer-implemented method, wherein the transmit request is approved if the difference is greater than the third number of clock cycles.

In some implementations, the techniques described herein relate to a computer-implemented method, wherein if the difference is less than the third number of clock cycles, the computer-implemented method further includes: holding, by the first circuit, the transmit request; receiving, by the first circuit, an update to the second number associated with processing by the second circuit of the messages previously transmitted by the first circuit; and approving, by the first circuit, the transmit request responsive to the difference between the first number and the second number being greater than the third number of clock cycles.

In some implementations, the techniques described herein relate to a computer-implemented method, further including: receiving, by the first circuit, the second number having a value corresponding to a processing capacity of the second circuit for processing of the messages from the first circuit; and receiving, by the first circuit, updates to the second number from the second circuit that processes the messages previously transmitted by the first circuit.

In some implementations, the techniques described herein relate to a computer-implemented method, wherein the first number and the second number are associated with a processing capacity of the second circuit.

In some implementations, the techniques described herein relate to a computer-implemented method, further including: incrementing, by the first circuit, the first number for each of the messages previously transmitted by the first circuit to the second circuit over the communication channel.

In some implementations, the techniques described herein relate to a computer-implemented method, wherein: prior to processing of the messages previously transmitted by the first circuit, the second number is initialized, by the second circuit, to a value corresponding to a processing capacity of the second circuit for processing of the messages from the first circuit.

In some implementations, the techniques described herein relate to a computer-implemented method, further including: receiving, by the first circuit, the second number from the second circuit.

In some implementations, the techniques described herein relate to a computer-implemented method, wherein: the second number that is transmitted to the first circuit responsive to each receipt of the messages from the first circuit is incremented, by the second circuit, responsive to determining that available storage for messages satisfies a threshold.

In some implementations, the techniques described herein relate to a computer-implemented method, wherein: the second number that is transmitted to the first circuit responsive to processing of at least one of the messages from the available storage for the messages is incremented, by the second circuit, responsive to determining that the available storage for the messages does not satisfy the threshold.

In some implementations, the techniques described herein relate to a computer-implemented method, wherein the first number includes one or more first numbers that are each associated with a respective type of the messages transmitted by the first circuit, wherein the second number includes one or more second numbers that each correspond to one of the one or more first numbers, and further including: identifying, by the first circuit, a type of the message associated with the transmit request; and approving, by the first circuit, the transmit request based on the type of the message.

In some implementations, the techniques described herein relate to a system for managing channel accessibility, the system including: a first circuit arranged to: detect a transmit request from the first circuit to transmit a message into a communication channel connecting the first circuit to a second circuit; and transmit the message into the communication channel based on an evaluation of a first number associated with messages previously transmitted by the first circuit to the second circuit over the communication channel and a second number associated with processing by the second circuit of the messages previously transmitted by the first circuit.

In some implementations, the techniques described herein relate to a system, wherein the first number and the second number are binary values, and wherein the evaluation includes subtracting the first number from the second number.

In some implementations, the techniques described herein relate to a system, wherein the message is to be transmitted into the communication channel over a third number of clock cycles, and wherein the evaluation includes comparing the third number of clock cycles to a difference between the first number and the second number.

In some implementations, the techniques described herein relate to a system, wherein the transmit request is approved if the difference is greater than the third number of clock cycles.

In some implementations, the techniques described herein relate to a system, wherein if the difference is less than the third number of clock cycles, the first circuit is further arranged to: hold the transmit request; receive an update to the second number associated with processing by the second circuit of the messages previously transmitted by the first circuit; and approve the transmit request responsive to the difference between the first number and the second number being greater than the third number of clock cycles.

In some implementations, the techniques described herein relate to a system, wherein the first circuit is further arranged to: receive the second number having a value corresponding to a processing capacity of the second circuit for processing of the messages from the first circuit; and receive updates to the second number from the second circuit responsive to the second circuit processing the messages previously transmitted by the first circuit.

In some implementations, the techniques described herein relate to a non-transitory computer-readable medium including one or more computer-executable instructions that, when executed by a first circuit, cause the first circuit to: detect a transmit request from the first circuit to transmit a message into a communication channel connecting the first circuit to a second circuit; and transmit the message into the communication channel based on an evaluation of a first number associated with messages previously transmitted by the first circuit to the second circuit over the communication channel and a second number associated with processing by the second circuit of the messages previously transmitted by the first circuit. Features from any of the implementations described herein can be used in combination with one another in accordance with the general principles described herein. These and other implementations, features, and advantages will be more fully understood upon reading the following detailed description in conjunction with the accompanying drawings and claims.

Below are provided, with reference to FIGS. 1-8, detailed descriptions of example systems for managing command channel accessibility. Detailed descriptions of examples of computer-implemented methods are also provided in connection with FIGS. 9-10. It should be appreciated that while example implementations are provided, other implementations are possible, and implementations are not limited to operating in accordance with the examples below.

FIG. 1 is a block diagram of an example system 100 for managing channel accessibility. As illustrated in this figure, example system 100 can include an allocation controller 170 for managing channel accessibility. As will be explained in greater detail below, the system 100 can include a synchronous circuit 110A and a synchronous circuit 110B with a clock 120A and clock 120B. The synchronous circuit 110A and the synchronous circuit 110A can be arranged to exchange communications 130A and communications 130B (generally referred to as communications 130). The synchronous circuit 110A and the synchronous circuit 110A can be arranged to exchange allocations. The synchronous circuit 110A and the synchronous circuit 110A can be arranged to communicate via an adapter 150, which can include a communication channel 160 and an allocation controller 170. While adapter 150 is illustrated in the example of FIG. 1 as a separate element from the synchronous circuit 110A and the synchronous circuit 110B, in other implementations the adapter 150 may be formed physically together with one of the synchronous circuit 110A and synchronous circuit 110B or otherwise be formed as a part of one of the synchronous circuit 110A and synchronous circuit 110B. In some such implementations, some components of adapter 150 may be formed in synchronous circuit 110A, other components in the synchronous circuit 110B, and some circuits shared between the synchronous circuit 110A and the synchronous circuit 110B. Implementations are not limited in this respect.

In some implementations, the system 100 and its components, such as the synchronous circuits and the adapter 150, of FIG. 1 can be included within a chip, such as an integrated circuit, system on a chip (SoC), or other chip. In some cases, the chip can be a processing unit, such as a data processing unit (DPU), central processing unit (CPU), or graphics processing unit (GPU). Example system 100 can include an allocation controller 170 for performing one or more tasks, such as in response to computer-executable instructions to be executed by at least one processor.

The synchronous circuits include a clock configured to generate clock signals for causing the synchronous circuits to perform one or more tasks, such as generating and transmitting the communications 130. Each clock can generate a unique clock frequency. For example, clock 120A can generate a clock frequency of 433 MHz while clock 120B can generate a clock frequency of 1 GHz. Since the clocks can generate different clock frequencies, the synchronous circuits can operate at different clock frequencies from each other, and thus the synchronous circuits can be asynchronous relative to each other.

Communications 130 can include any form of commands, messages, packets, or computer-readable instructions. Examples of communications 130 include read, writes, encryptions, checksums, transmissions, or any other instructions received from a Network on Chip (NoC), Network Interface Controller (NIC), user logic, or fabric adapter. The communications 130 can be generated by the synchronous circuits and transmitted to the adapter 150 for transfer to other synchronous circuits.

Counts 140 can include any form of credits, numbers, bits, packets, or computer-readable instructions that indicate a number of clock cycles to access (e.g., read or write) the communication channel 160. For example, the counts 140 can indicate a number of units of storage that processed the communications 130 from storage to free up the units of storage. In some implementations, the counts 140 may be a count of credits, and transmitting the communications 130 for one clock cycle to be stored in a unit of storage may use a credit and processing the communications 130 from storage may release a credit. The counts 140 can be configured to be utilized by the synchronous circuits and the adapters 150.

The adapter 150 can include any component configured to be an intermediary for transferring communications between asynchronous circuits. The adapter 150 can include a communication channel 160 that can transfer the communications 130 among the synchronous circuits. The communication channel 160 can include one or more channels in which to convert the communications 130 from one data width to another data width. For example, the communication channel 160A can convert the communications 130A and the communication channel 160B can convert communications 130C from being formatted for communication over a 256-bit channel to communications 130B or communications 130D that are formatted for communication via a 128-bit channel. In another example, the communication channel 160C can convert the communications 130B and the communication channel 160D can convert communications 130D that are 128-bits to the communications 130A or communications 130C that are 256-bits.

The allocation controller 170 can manage the allocation of the communications 130 in the communication channel 160 during the conversion while the communications 130 arrive at one frequency (e.g., 433 MHZ) and bit width (e.g., 256-bits) and are transmitted a different frequency (e.g., 1 GHZ) and different bit width (e.g., 128-bits). To manage the allocation, the allocation controller 170 can monitor the reading and writing of the communications 130. For example, the allocation controller 170A can manage the counts 140 of the communications 130A and the allocation controller 170B can manage the counts 140 of the communications 130C being formatted for communication over a 256-bit channel to communications 130B and communications 130D that are formatted for communication via a 128-bit channel. In another example, the allocation controller 170C can manage the counts 140 of the communications 130B and the allocation controller 170D can manage the counts 140 of the communications 130D that are 128-bits being converted to the communications 130A and communications 130C that are 256-bits.

As illustrated in FIG. 1, the allocation controller 170 can be or include one or more physical processors. Physical processors can represent any type or form of hardware-implemented processing unit capable of interpreting and/or executing computer-readable instructions. In one example, the allocation controller 170 can access and/or modify one or more components (e.g., synchronous circuit 110A, synchronous circuit 110B, communications 130, and/or counts 140) of the system 100. In one example, the allocation controller 170 can access and/or modify the memory of the system 100. Additionally, or alternatively, the allocation controller 170 can process one or more of components of the system 100 to facilitate managing channel accessibility. Examples of the allocation controller 170 includes, without limitation, cores, logic units, microprocessors, microcontrollers, Field-Programmable Gate Arrays (FPGAs) that implement softcore processors, Application-Specific Integrated Circuits (ASICs), portions of one or more of the same, variations or combinations of one or more of the same, or any other suitable physical processor.

Figure 8:
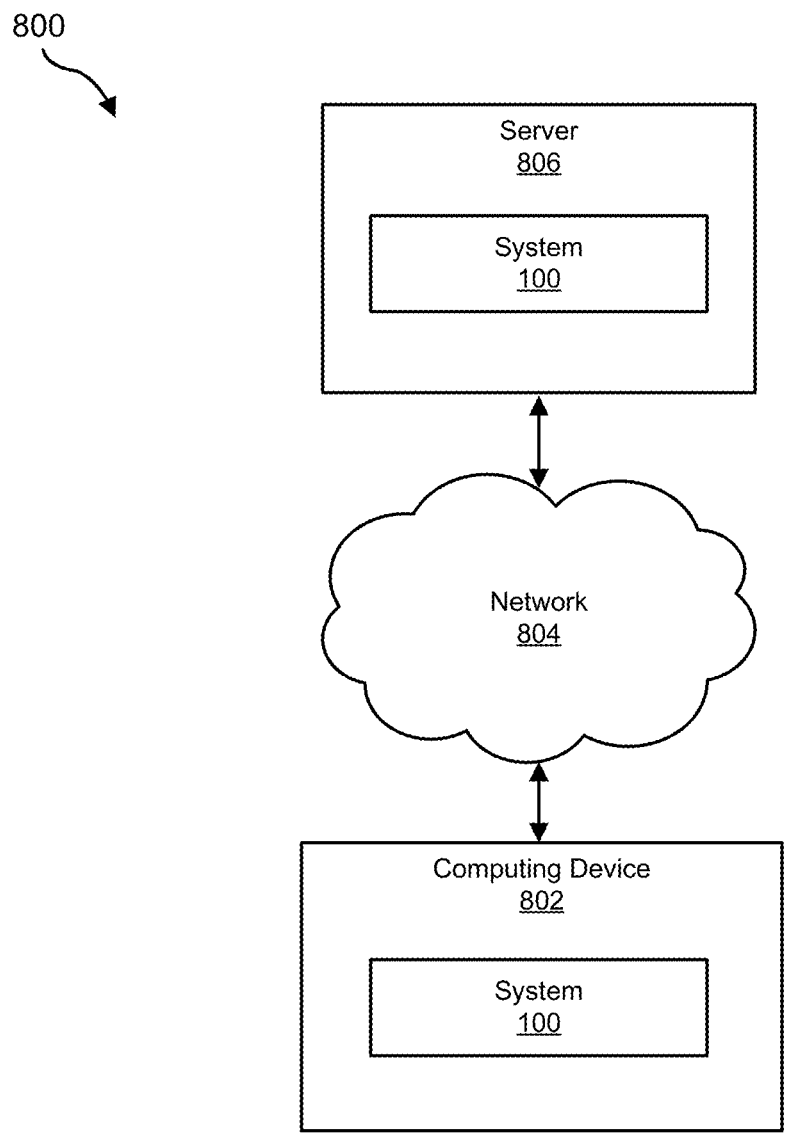
FIG. 8 is a block diagram of a computer system with which some implementations may operate.

In certain implementations, the system 100 may be a component of one or more computing devices, such as the devices illustrated in FIG. 8 (e.g., computing device 802 and/or server 806). The system 100 in FIG. 1 can represent all or portions of one or more special-purpose computers configured to perform one or more tasks.

While not explicitly illustrated in FIG. 1, system 100 can also include one or more memory devices. Memory generally represents any type or form of volatile or non-volatile storage device or medium capable of storing data and/or computer-readable instructions. In one example, memory can store, load, and/or maintain the processor. Examples of memory include, without limitation, Random Access Memory (RAM), Read Only Memory (ROM), flash memory, caches, variations, or combinations of one or more of the same, or any other suitable storage memory.

Figure 2:
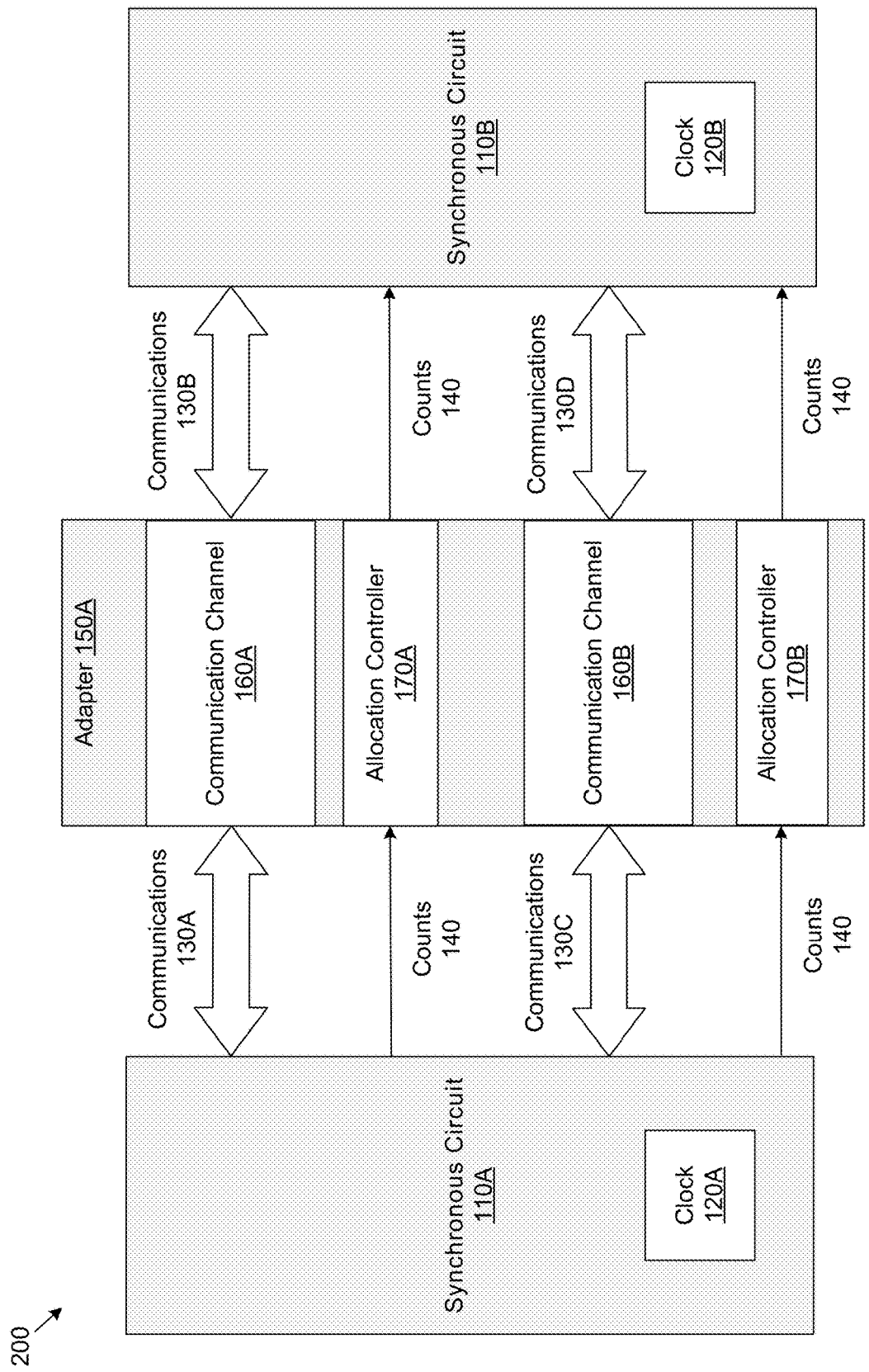
FIG. 2 is a block diagram of an example system for managing channel accessibility.

FIG. 2 illustrates another system 200 with which some implementations may operate and is shown in more detail than FIG. 1. Similar elements are labeled with corresponding numbers and labels from FIG. 1. Some functionality of elements shown in FIG. 2 is also described below in connection with FIGS. 9-10. System 200 can be an implementation of an ingress system that includes an adapter 150A configured as an ingress adapter to transfer communications 130A having a wide bit width (e.g., 256-bits) from the synchronous circuit 110A having a clock 120A that is slower (e.g., 433 MHZ) to the synchronous circuit 110B having the clock 120B that is faster (e.g., 1 GHZ) with a smaller bit width (e.g., 128-bits). While FIG. 2 illustrates two communication channels with two corresponding allocation controllers, it is contemplated that the adapter 150A can include a fewer or greater number of communication channels and corresponding allocation controllers.

In some implementations, the communication channel 160A is a data interface configured to handle data transmissions. For example, the communication channel 160A may include 16 interfaces or channels across which to handle the communications 130, but any number of interfaces or channels is contemplated. In some implementations, the communication channel 160B is a command interface configured to handle the communications 130. For example, the communication channel 160B may include 10 interfaces or channels across which to handle the communications 130, but any number of interfaces or channels is contemplated.

Figure 3:
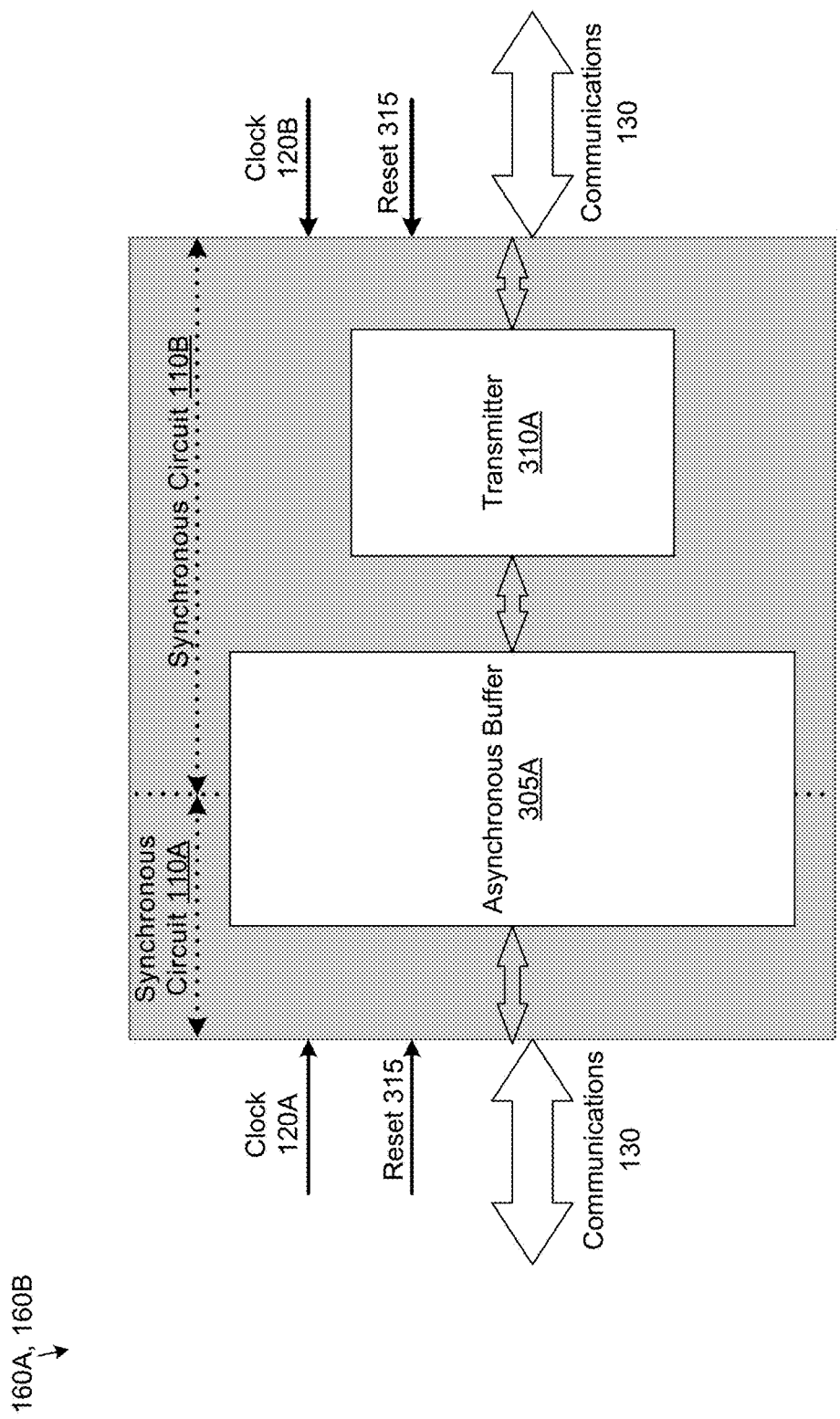
FIG. 3 is a block diagram of an example data path of the system for managing channel accessibility.

FIG. 3 illustrates an implementation of the communication channel 160A or 160B of the adapter 150A of system 200. The communication channel 160 can include an asynchronous buffer 305A, which can include first-in-first-out (FIFO) buffer queues for converting the bit widths of the communications 130. The asynchronous buffer 305A can convert the communications 130 according to a conversion mode, which can depend on the number of channels or interfaces in the communication channel 160 and the bit widths to be converted.

For example, the asynchronous buffer 305A can make the conversions of the communications 130 across groups of 4 channels. In a single width mode, the asynchronous buffer 305A can convert the communications 130 separately in each channel. For example, the asynchronous buffer 305A can convert 256-bit communications to 128-bits across each of the 4 channels configured to convert from 256-bits to 128-bits. In a dual width mode, the asynchronous buffer 305A can pair the channels to convert communications 130 having larger bit widths. For example, the asynchronous buffer 305A can pair each channel to convert 512-bit communications to 256-bits. In a quad width mode, the asynchronous buffer 305A can distribute the communications 130 across all the channels to convert communications 130A having even larger bit widths. For example, the asynchronous buffer 305A can distribute 1024-bit communications across each channel to convert 1024-bit communications to 512-bits.

In some implementations, the conversion mode is set according to registers in the adapter 150A. In some implementations, the communication channel 160 can include a transmitter 310A configured to transmit and/or push the communications 130 to the synchronous circuit 110B. For example, the transmitter 310A can be configured to transmit the communications 130 after their bit-width has been converted. While the adapter 150A outputs the communications 130 across a bit-width that is less from the bit-width at which the communications 130 were inputted, the adapter 150A does not modify the data contained in the communications 130 after the conversion. In some implementations, the synchronous circuits can receive resets 315. For example, the synchronous circuit 110A can receive the reset 315 while the synchronous circuit 110B can receive the reset 315. The resets 315 can be signals to reset, clear, or set a value for the synchronous circuits.

Figure 4:
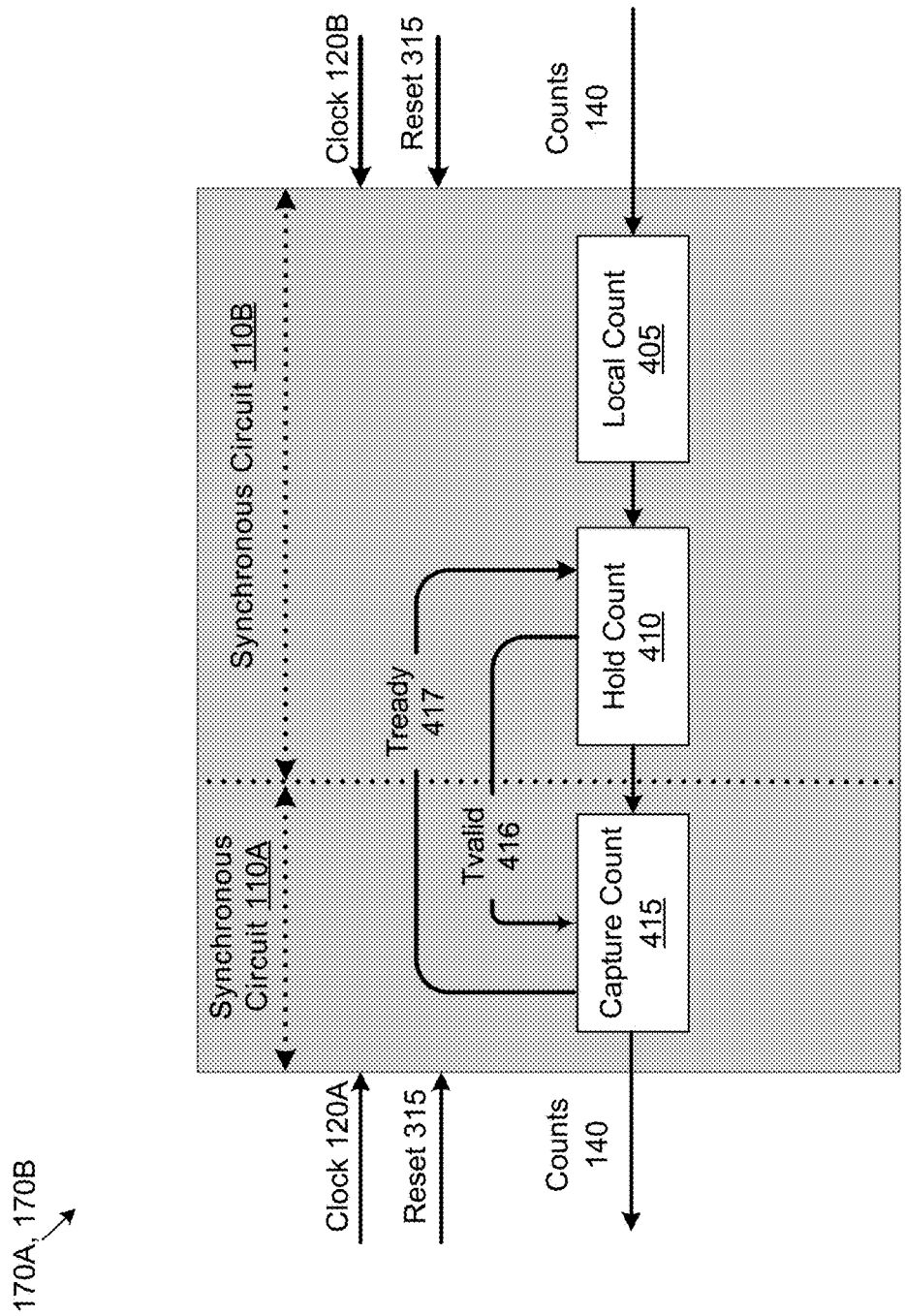
FIG. 4 is a block diagram of an example allocation controller of the system for managing channel accessibility.

FIG. 4 illustrates an example implementation of the allocation controller 170A or 170B of the adapter 150A of system 200. In some implementations, the local count 405 and the hold count 410 are located on the synchronous circuit 110B that receives communications 130 transmitted over the communication channel 160. In some implementations, the synchronous circuit 110B can manage, access, and/or modify the local count 405 and the hold count 410 based on the processing of the communications 130 (e.g., reads) from the communication channel 160 by the synchronous circuit 110B.

In some implementations, the local count 405 can be a number associated with processing (e.g., receipt) by the synchronous circuit 110B of the communications 130 previously transmitted by the synchronous circuit 110A to the synchronous circuit 110B. For example, the local count 405 can be a view of the availability of the communication channel 160 from the perspective of the synchronous circuit 110B.

In some implementations, the hold count 410 can be a number based on the local count 405. The synchronous circuit 110B can modify (e.g., increment) the hold count 410 based on the modifications to the local count 405. For example, the synchronous circuit 110B can set the hold count 410 to the local count 405.

In some implementations, the capture count 415 is located on the synchronous circuit 110A. In some implementations, the capture count 415 can be a number associated with communications 130 processed by the synchronous circuit 110B. In some implementations, the allocation controller 170 can facilitate the communication, transfer, and/or synchronization of the hold count 410 and the capture count 415 (which are described below) as the communications 130 are processed (e.g., reads and writes) via the communication channel 160. For example, the capture count 415 can be a view of the availability of the communication channel 160 from the perspective of the synchronous circuit 110B. In another example, the capture count 415 can be set to the local count 405.

The synchronous circuit 110B can use the valid 416 signal and the ready 417 signal to synchronize the hold count 410 across the clock domain with the capture count 415 of the synchronous circuit 110A. Since the hold count 410 is based on the local count 405, the synchronous circuit 110B can thus synchronize the local count 405 with the capture count 415. For example, the hold count 410 can be provided to the synchronous circuit 110A to provide a view of the availability of the communication channel 160 from the perspective of the synchronous circuit 110B. In some implementations, the allocation controller 170 can facilitate the communication, transfer, and/or synchronization of the hold count 410 and the capture count 415 (which are described below) as the communications 130 are processed (e.g., reads and writes) via the communication channel 160.

In some implementations, the synchronous circuit 110A can manage, access, and/or modify a local number based on the processing of the communications 130 (e.g., writes) via the communication channel 160 by the synchronous circuit 110A. In some implementations, the synchronous circuit 110A can detect a transmit request from the synchronous circuit 110A to transmit communications 130 into the communication channel 160 connecting the synchronous circuit 110A to the synchronous circuit 110B. The synchronous circuit 110A can modify (e.g., increment) the local number based on a number of clock cycles to be used or that are used to write the communications 130 into the communication channel 160 to transmit the communications 130. The local number can be incremented when the communications 130 are transmitted by the synchronous circuit 110A. For example, if the communications 130 are processed (e.g., written) over four clock cycles, the synchronous circuit 110A can increment the local number by 4 or, in binary, (0000-0100).

In some such implementations, the synchronous circuit 110A uses the local number and the capture count 415 to determine whether the communications 130 to be transmitted can be received by the synchronous circuit 110B over the communication channel 160. Examples of ways in which this determination can be made in some implementations are described below. As a brief example, the synchronous circuit 110A may compare a number of clock cycles that would be needed to communicate the communications 130 over the communication channel 160 to the synchronous circuit 110B to the capacity of the synchronous circuit 110B at that time. The capacity may be determined by the synchronous circuit 110A using the local count of transmissions made and the capture count 415 of received transmissions previously processed by the synchronous circuit 110B. As a specific example, the local count and the capture count 415 can be fixed-width binary numbers and the synchronous circuit 110A can subtract the local count of prior transmissions from the capture count 415 to yield a current capacity of the synchronous circuit 110B, which can be a number of units of transmission that can be received and stored at that time, which corresponds in this example to a number of clock cycles that can be used to transmit data. If the number of available units of transmission is larger than the number of clock cycles that would be needed to transmit the communications 130, the synchronous circuit 110A determines that the communications 130 can be transmitted and transmits the communications 130. If not, the synchronous circuit 110B waits until the capture count 415 is updated and the calculation indicates sufficient capacity.

Figure 5:
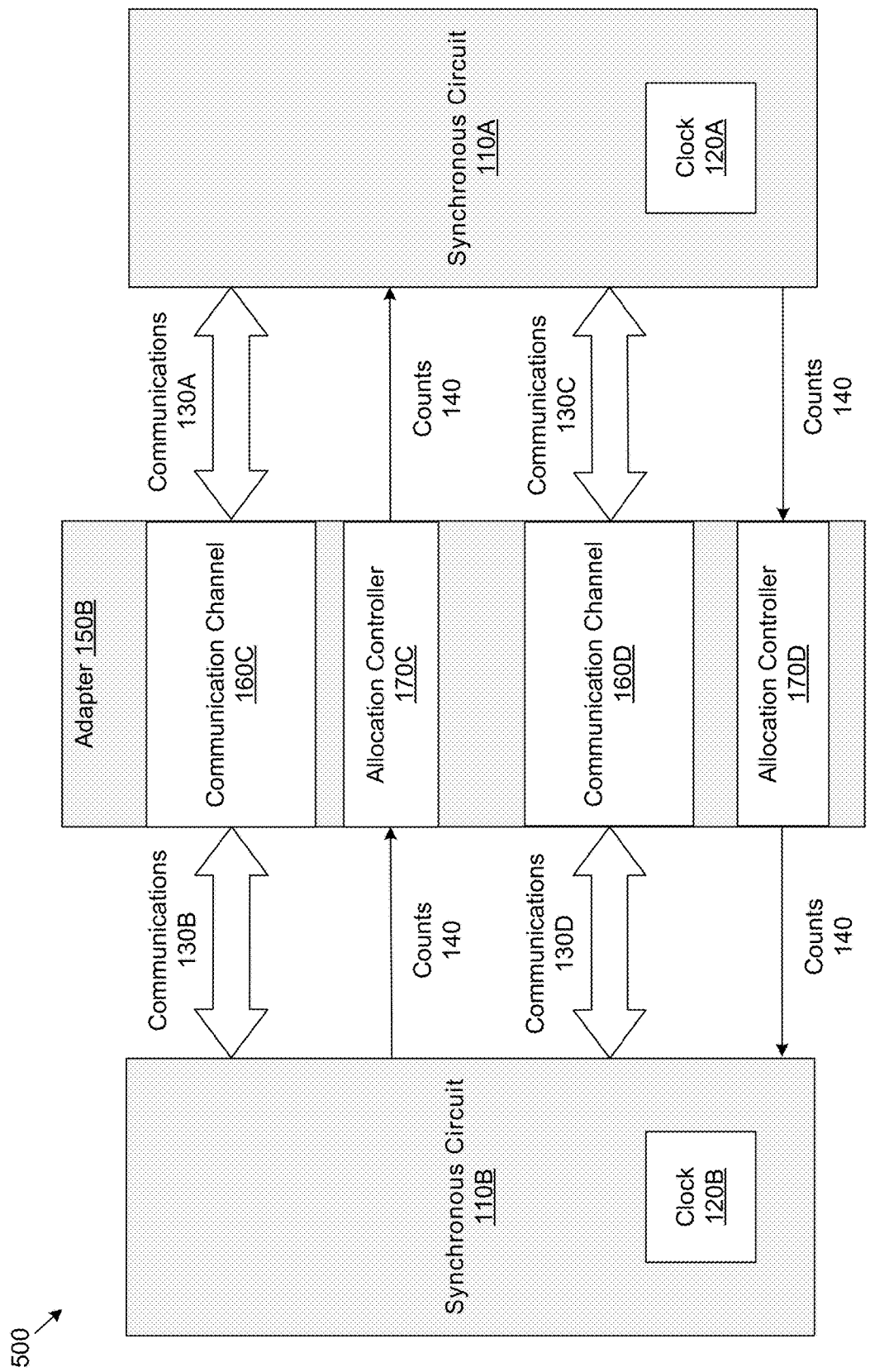
FIG. 5 is a block diagram of an example system for managing channel accessibility.

FIG. 5 illustrates another system 500 with which some implementations can operate and is shown in more detail than FIG. 1. Similar elements are labeled with corresponding numbers and labels from FIG. 1. Some functionality of elements shown in FIG. 5 is also described below in connection with FIGS. 9-10. System 500 can be an implementation of an egress system that includes an adapter 150B configured as an egress adapter to transfer communications 130 having a smaller bit width (e.g., 128-bits) from the synchronous circuit 110B having the clock 120B that is faster (e.g., 1 GHz) to the synchronous circuit 110A having a clock 120A (e.g., 433 MHz) that is slower with a wide bit width (e.g., 256-bits). While FIG. 5 illustrates two communication channels with two corresponding allocation controller, it is contemplated that the adapter 150B can include a fewer or greater number of communication channels and corresponding allocation controllers.

In some implementations, the communication channel 160C is a data interface configured to handle data transmissions. For example, the communication channel 160C may include 16 interfaces or channels across which to handle the communications 130, but any number of interfaces or channels is contemplated. In some implementations, the communication channel 160D is a command interface configured to handle the communications 130. For example, the communication channel 160D may include 10 interfaces or channels across which to handle the communications 130, but any number of interfaces or channels is contemplated.

Figure 6:
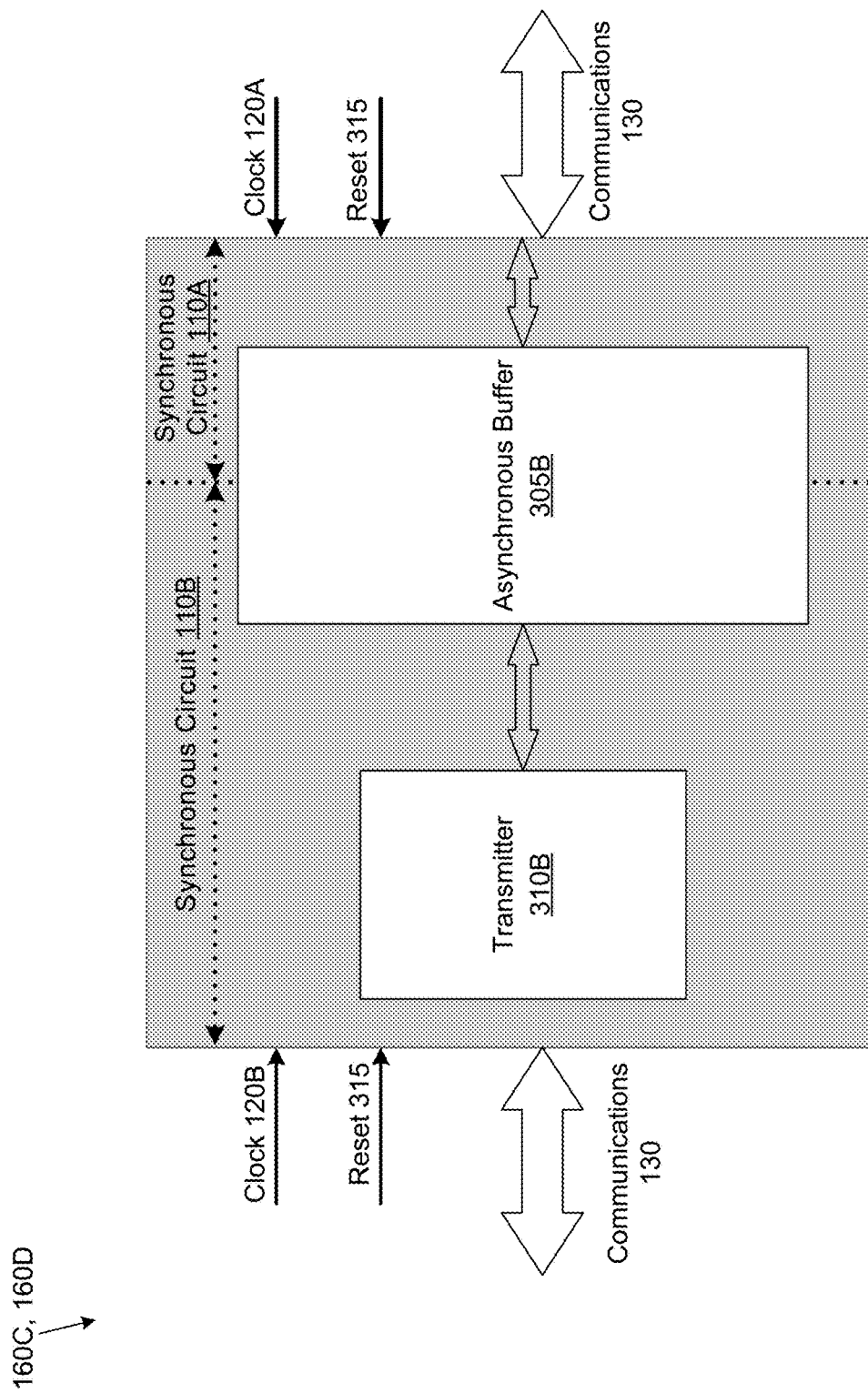
FIG. 6 is a block diagram of an example data path of the system for managing channel accessibility.

FIG. 6 illustrates an implementation of the communication channel 160C or 160D of the adapter 150B of system 200. The communication channel 160 can include an asynchronous buffer 305B, which can include first-in-first-out (FIFO) buffer queues for converting the bit widths of the communications 130. The asynchronous buffer 305B can convert the communications 130 according to a conversion mode, which can depend on the number of channels or interfaces in the communication channel 160 and the bit widths to be converted.

For example, the asynchronous buffer 305B can make the conversions of the communications 130 across groups of 4 channels. In a single width mode, the asynchronous buffer 305B can convert the communications 130 separately in each channel. For example, the asynchronous buffer 305B can convert 128-bit communications to 256-bits across each of the 4 channels configured to convert from 128-bits to 256-bits. In a dual width mode, the asynchronous buffer 305B can pair the channels to convert communications 130 having larger bit widths. For example, the asynchronous buffer 305B can pair each channel to convert 256-bit communications to 512-bits. In a quad width mode, the asynchronous buffer 305B can distribute the communications 130 across all the channels to convert communications 130 having even larger bit widths. For example, the asynchronous buffer 305B can distribute 1024-bit communications across each channel to convert 512-bit communications to 1024-bits.

In some implementations, the conversion mode is set according to registers in the adapter 150B. In some implementations, the communication channel 160 can include a transmitter 310B configured to transmit and/or push the communications 130 to the synchronous circuit 110A. For example, the transmitter 310B can be configured to transmit the communications 130 after their bit-width has been converted. While the adapter 150B causes the communications 130 to have a greater bit-width, the adapter 150B does not modify the data contained in the communications 130 after the conversion. In some implementations, the synchronous circuits can receive resets 315. For example, the synchronous circuit 110A can receive the reset 315 while the synchronous circuit 110B can receive the reset 315. The resets 315 can be signals to reset, clear, or set a value for the synchronous circuits.

Figure 7:
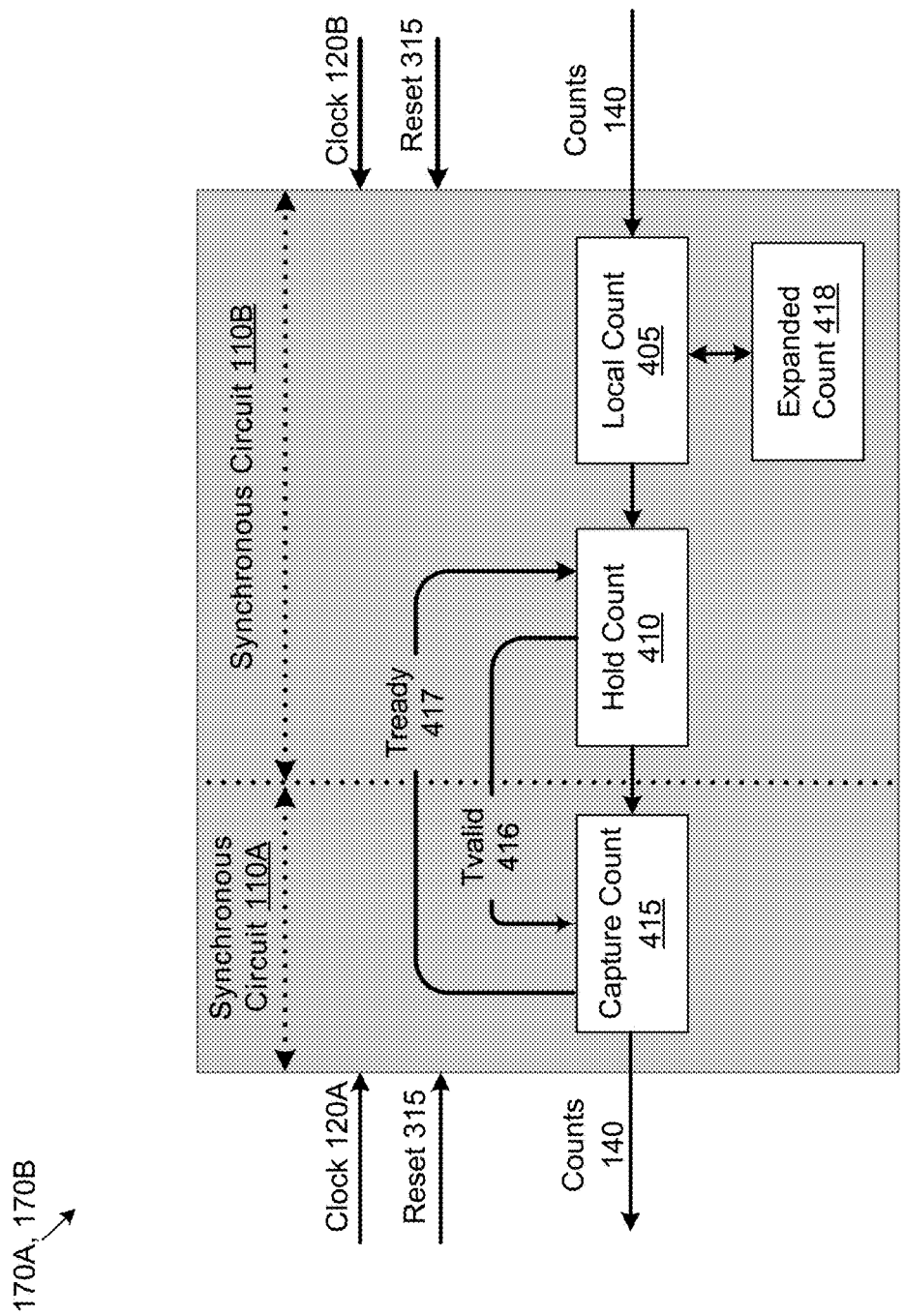
FIG. 7 is a block diagram of an example allocation controller of the system for managing channel accessibility.

FIG. 7 illustrates an example implementation of the allocation controller 170A or 170B of the adapter 150A of system 200. In some implementations, the allocation controller 170 of FIG. 7 are similar to the allocation controller 170 of FIG. 4, except that can also facilitate the communication, transfer, and/or synchronization of the expanded count 418 from the synchronous circuit 110B as the communications 130 are processed (e.g., reads and writes) via the communication channel 160.

The synchronous circuit 110B can use the expanded count 418 to track utilization of reserve or otherwise additional storage for the communications 130. In some implementations, the expanded count 418 can correspond to a reserve of storage available for storing and/or processing the communications 130 received over the clock cycles. In some implementation, one unit of storage is used per clock cycle used to process and/or store the communications 130. For example, the communication channel 160 may include more storage represented by a capacity of 10-bits but a single communication may only be represented as 8-bits because of a fabric interconnect. In some implementations, the synchronous circuit 110B can initialize the expanded count 418 to the processing capacity of the communication channel 160. For example, the synchronous circuit 110B can initialize the bottom 8-bits of an expanded count 418 that includes 10-bit if the communication channel 160 is limited to 8-bits. In some implementations, there may be different allocations for different channels, such that there are multiple allocations in addition to the system allocation.

The components and devices illustrated in FIGS. 1-7 can be implemented in a variety of ways. For example, all or a portion of system 100 can represent portions of system 800 in FIG. 8. As shown in FIG. 8, system 800 can include a computing device 802 in communication with a server 806 via a network 804. In one example, all or a portion of the functionality of system 100 can be performed by the computing device 802, server 806, and/or any other suitable computing system. As will be described in greater detail below, one or more components from FIG. 1 can, when executed by at least one processor of computing device 802 and/or server 806, enable computing device 802 and/or server 806 to manage order of command processing.

Computing device 802 generally represents any type or form of computing device capable of reading computer-executable instructions. For example, the computing device 802 can be an integrated circuit or a network interface controller (NIC). Additional examples of computing device 802 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations, or combinations of one or more of the same, or any other suitable computing device.

Server 806 generally represents any type or form of computing device that is capable of reading computer-executable instructions. For example, the server 806 can include circuits or network interfaces. Additional examples of server 806 include, without limitation, storage servers, database servers, application servers, and/or web servers configured to run certain software applications and/or provide various storage, database, and/or web services. Although illustrated as a single entity in FIG. 8, server 806 can include and/or represent a plurality of servers that work and/or operate in conjunction with one another.

Network 804 generally represents any medium or architecture capable of facilitating communication or data transfer. In one example, network 804 can facilitate communication between computing device 802 and server 806. In this example, network 804 can facilitate communication or data transfer using wireless and/or wired connections. Examples of networks 804 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems can be connected to the components and devices illustrated in FIGS. 1-8. Conversely, all the components and devices illustrated in FIGS. 1-8 need not be present to practice the implementations described and/or illustrated herein. The devices and subsystems referenced above can also be interconnected in different ways from that shown in FIG. 1-8. The components and devices illustrated in FIGS. 1-3 can also employ any number of software, firmware, and/or hardware configurations. For example, one or more of the example implementations disclosed herein can be encoded as a computer program (also referred to as computer software, software applications, computer-executable instructions, and/or computer control logic) on a computer-readable medium.

The term "computer-readable medium," as used herein, generally refers to any form of device, carrier, or non-transitory medium capable of storing or carrying computer-executable instructions. Examples of computer-readable media include, without limitation, non-transitory transmission-type media, such as carrier waves, and non-transitory-type media, such as non-transitory magnetic-storage media (e.g., hard disk drives, tape drives, and floppy disks), optical-storage media (e.g., Compact Disks (CDs), Digital Video Disks (DVDs), and BLU-RAY disks), non-transitory electronic-storage media (e.g., solid-state drives and flash media), and other non-transitory distribution systems.

Figure 9:
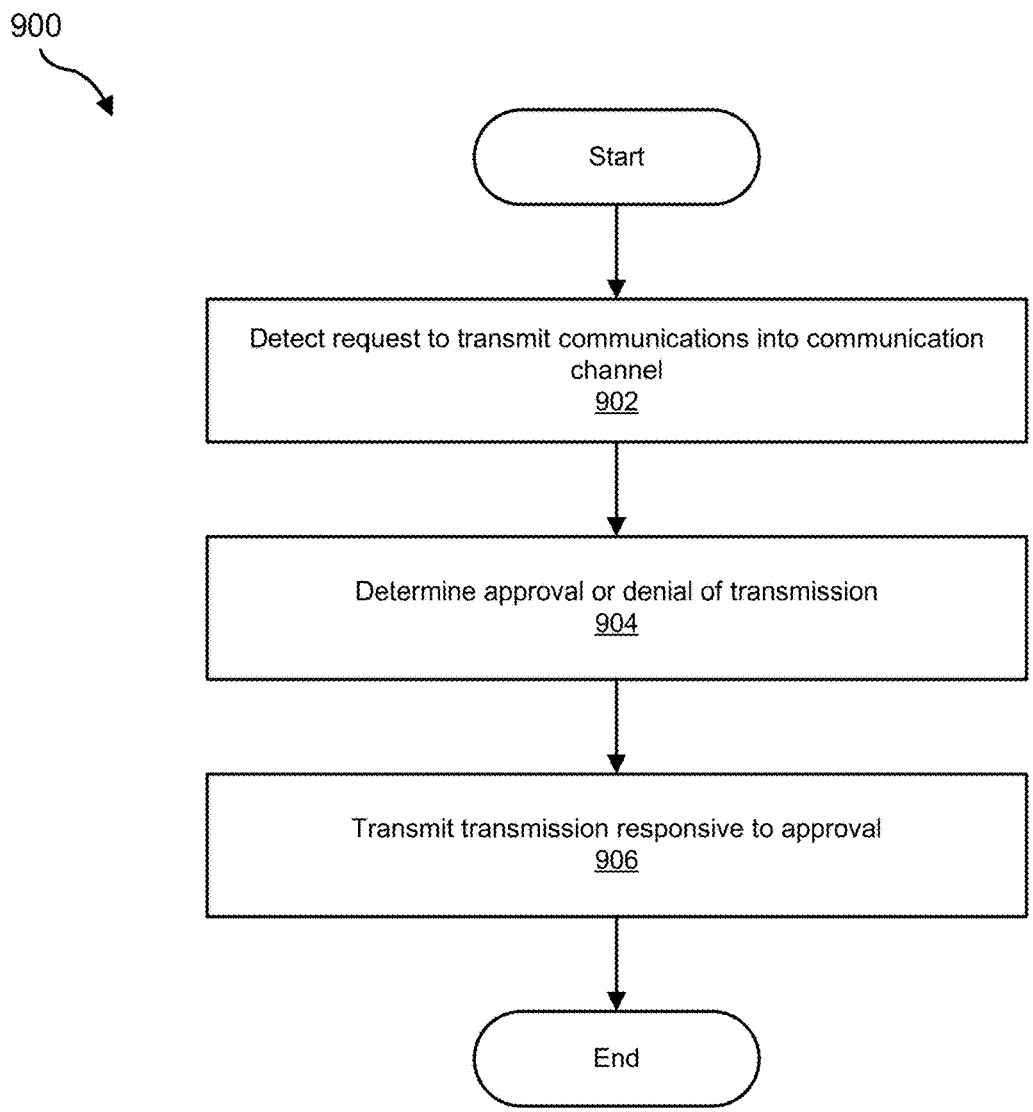
FIG. 9 is a flow diagram of an example method for managing channel accessibility.

FIG. 9 is a flow diagram of an example computer-implemented method 900 for managing channel availability. The steps shown in FIG. 9 can be performed by all the components and devices illustrated in FIGS. 1-8. In one example, each of the steps shown in FIG. 9 can represent an algorithm whose structure includes and/or is represented by multiple sub-steps, examples of which will be provided in greater detail below.

As illustrated in FIG. 9, at step 902, one or more of the systems described herein can detect requests to transmit (e.g., write) communications 130 into the communication channel 160. For example, the synchronous circuit 110A can, as part of system 100 in FIG. 1, detect the requests to write communications 130 into the communication channel 160. The systems described herein can perform step 902 in a variety of ways. In one example, the synchronous circuit 110A can identify requests (e.g., writes) in the communication channel 160 for transferring communications 130 to the synchronous circuit 110B.

In some implementations, the synchronous circuit 110A detects the request to utilize (e.g., write) one or more clock cycles to transmit the communications 130 via the communication channel 160. The synchronous circuit 110A can make the detection during each clock cycle of the clock 120A. If the synchronous circuit 110A identifies a request to use the communication channel 160, the synchronous circuit 110A can identify the number of clock cycles required by the request. The synchronous circuit 110A can modify the local number (e.g., a counter or a register) by the number of clock cycles. For example, the synchronous circuit 110A can increment the local number by the number of clock cycles to be used for transmitting the communications 130 in the communication channel 160.

The synchronous circuit 110A can initialize the counter as to indicate full availability (e.g., all the clock cycles are available for transmitting the communications 130) of the communication channel 160. In some implementations, the synchronous circuit 110A can initialize the capture count 415 to the capacity of the communication channel 160. For example, the capacity can be a number associated with a number of clock cycles available for processing communications 130 in the communication channel 160. In some implementations, in response to determining that the capture count 415 has not been initialized, the synchronous circuit 110A can initialize each bit of the capture count 415 to 1. In some implementations, the capture count 415 can be represented as an 8-bit counter for 256 clock cycles available for processing via the communication channel 160. For example, the synchronous circuit 110A can set the capture count 415 as an 8-bit register active high to 255 (e.g., 1111-1111) for a 256-bit channel. In other implementations, the synchronous circuit 110A may modify the capture count 415, such as by synchronizing the capture count 415 with the hold count 410 as described below.

As illustrated in FIG. 9, at step 904, one or more of the systems described herein can generate an approval or a denial of the request to transmit (e.g., write) communications 130 into the communication channel 160. For example, the synchronous circuit 110A can, as part of system 100 in FIG. 1, can approve or deny the request to transmit the communications 130 into the communication channel 160. For example, the synchronous circuit 110A transmitting the communications 130 can request to transmit the communications 130 to the synchronous circuit 110B via the communication channel 160. The systems described herein can perform step 904 in a variety of ways. In one example, the synchronous circuit 110A can identify whether enough clock cycles are available to process the communications 130 based on an evaluation of the capture count 415 and the local number.

In some implementations, the synchronous circuit 110A can determine whether to approve the transmit request of the communications 130 based on an evaluation of the capture count 415 and the local number. The synchronous circuit 110A can compare the capture count 415 to the local number to determine an availability count, which can be indicative of a number of clock cycles available and a number of units of storage available for the communications 130 to be transmitted via the communication channel 160. For example, when each transmission clock cycle uses one unit of storage for storing communicated data, the local number can be indicative of the number of clock cycles that are available. In some implementations, the availability count can be a counter, or a register maintained by the synchronous circuit 110A. For example, if the capture count 415 was initialized to (1111-1111) to indicate 256 available clock cycles and/or units of storage, the synchronous circuit 110A can subtract the local number value of (0000-0100) from the capture count 415 to generate a result of (1111-1011) to indicate that 252 clock cycles and/or storage units are available after the request for 4 clock cycles. In another example, if a subsequent request is to transmit over 3 clock cycles, the synchronous circuit 110A can increment the local number to (0000-0111). The synchronous circuit 110A can subtract the local number value of (0000-0111) from the capture count 415 to generate a result of (1111-1000) to indicate that 249 clock cycles and/or storage units are available after the transmit request for 3 clock cycles. Based on the evaluation of the capture count 415 and the local number, the synchronous circuit 110A can determine whether enough clock cycles and/or storage capacity are available to transmit the communications 130.

The synchronous circuit 110A can determine whether to approve the transmit request of the communications 130 by comparing the number of clock cycles available (i.e., storage units available) to the number of clock cycles required to transmit the communications 130. In some implementations, the synchronous circuit 110A can identify a number of clock cycles necessary to transmit the communications 130. If the synchronous circuit 110A determines that a particular communication will be transmitted over a number of clock cycles less than the available clock cycles, then the synchronous circuit 110A can approve the communication. For example, if the synchronous circuit 110A identifies that the communication will be processed over 249 or fewer clock cycles, the synchronous circuit 110A will approve the communication.

The synchronous circuit 110A can generate the comparisons to determine whether to approve or deny additional communications on the communication channel 160. To prevent the channel of the communication channel 160 from overflowing, the synchronous circuit 110A can approve transmitting of the communications 130 to the communication channel 160 until the difference between the capture count 415 and the local number indicates a reset (e.g., 0), which would indicate that the communication channel 160 is fully utilized. In some implementations, the synchronous circuit 110A can determine to deny the transmit request responsive to the difference between the capture count 415 and the local number being greater than the number of clock cycles necessary for processing the communication. For example, the synchronous circuit 110A can approve writes to a communication channel with a 256-clock cycle capacity until the difference between the capture count 415 and the local number is reset because of 256 more transmissions that consume clock cycles than processing that releases clock cycles. In another example, the synchronous circuit 110A can determine that a particular communication will be transmitted over 250 clock cycles and deny and hold that transmit request for the communication (e.g., maintain in a buffer or memory) to prevent overflowing the communication channel 160 if only 249 clock cycles are available.

In some implementations, the synchronous circuit 110A can reevaluate the comparison between the number of clock cycles available and the number of clock cycles to process the communications 130 to determine when the communications 130 can be approved. In some implementations, the synchronous circuit 110A can receive an update to the capture count 415 and determine to approve the transmit request responsive to the difference between the capture count 415 and the local count being greater than the number of clock cycles necessary for processing the communication.

In some implementations, the synchronous circuit 110B may initialize (e.g., before receiving and processing the communications 130) the local count 405. For example, the synchronous circuit 110B may set the local count 405 to a 0 value. The synchronous circuit 110B can modify (e.g., increment) the local count 405 based on a number of clock cycles used to process the communications 130 from the communication channel 160. In some implementations, the synchronous circuit 110B can increment the local count 405 when the communications 130 are processed by the synchronous circuit 110B. In some implementations, the synchronous circuit 110B can increment the local count 405 when the clock cycle is released (e.g., after the communications 130 are processed by the synchronous circuit 110B). For example, if the communications 130 are processed (e.g., read from storage) over four clock cycles, the synchronous circuit 110B can increment the local count 405 by 4 or, in binary, (0000-0100). The synchronous circuit 110B can transmit (e.g., send) the local count 405 to the hold count 410, which can be synchronized and/or transmitted across the clock domain to the capture count 415 of the synchronous circuit 110A.

In some implementations, to synchronize the hold count 410 with the capture count 415, the synchronous circuit 110B transmits the valid 416 signal to the synchronous circuit 110A, and the synchronous circuit 110A transmit the ready 417 signal to the synchronous circuit 110B. For example, the valid 416 signal and the ready 417 signal can be handshake signals to synchronize the capture count 415 and the hold count 410 across the clock domain. In some implementations, the synchronous circuit 110B can set the hold count 410 to the local count 405 responsive to detecting a ready 417 signal. For example, the synchronous circuit 110B can set the hold count 410 to the local count 405 responsive to detecting and/or receiving an edge signal from the synchronous circuit 110A. In some implementations, the synchronous circuit 110B can set the hold count 410 when the valid 416 signal is detected. For example, the synchronous circuit 110B can resample the hold count 410 when the valid 416 signal is toggled (e.g., transmitted) by the synchronous circuit 110B. Based on the valid 416 and ready 417 signals, the synchronous circuit 110B can update the hold count 410 based at an update rate that is determined by the combination of the clock 120A frequency of the synchronous circuit 110A and the clock 120B frequency of the synchronous circuit 110B.

By accessing the capture count 415 across the clock domains because of the synchronous circuits having different clocks, the synchronous circuit 110B can increment the capture count 415 only after the communications 130 are processed. For example, if the communications 130 are processed (e.g., read) over four clock cycles, the synchronous circuit 110B can cause the capture count 415 to be incremented by 4 from 255 to 3. In another example, in binary, from (1111-1111) to (0000-0011). Because the capture count 415 can be maintained as a fixed size in binary, the incrementing rolls over the binary value to 0 and then increments from 0.

In some implementations, the synchronous circuit 110A continues monitoring the transmit requests to generate approvals or denials of the request based on the local count and the capture count 415 as it is synchronized. After the synchronization, the synchronous circuit 110A can subtract the capture count 415 from the local number. For example, since the capture count 415 can indicate the clock cycles and/or storage units released and the local number can indicate the clock cycles and/or storage units consumed, the result of the subtraction of the capture count 415 from the local number indicates the availability of the clock cycles and/or storage units for transmitting the communications 130. In another example, the result of the subtraction decreases when transmitting the communications 130 increases the local number. In another example, the result of the subtraction increases when the processing (e.g., receipt) of the communications 130 increases the capture count 415. In another example, transmitting the communications 130 for one clock cycle to be stored in a unit of storage may decrease the result of the subtraction (e.g., use a credit) and the processing the communications 130 from storage may increase the result of the subtraction (e.g., release a credit).

The synchronous circuit 110A can generate the approvals if the difference satisfies (e.g., exceeds) a threshold value (e.g., 0 or when the difference is reset). In some implementations, the synchronous circuit 110A can allow transmissions to the synchronous circuit 110B via the communication channel 160 if the difference satisfies (e.g., exceeds) the threshold value. The difference not satisfying (e.g., exceeding) the threshold value would indicate that the communication channel 160 is fully utilized by transmissions, so the synchronous circuit 110A can generate denials of further writes. For example, the synchronous circuit 110A can approve transmissions to a 256-bit channel until the difference is reset because of 256 more transmissions than receipts.

For example, if the capture count 415 is set at (0000-0011) after synchronization described above, the comparison generated by the synchronous circuit 110A between the capture count 415 and the local number of (0000-0111) may indicate that 253 bits are available. By waiting to modify the capture count 415 until after the read request is synchronized across the clock domain, the synchronous circuit 110A can indicate a worst-case scenario of availability to prevent requests from overflowing the communication channel 160. For example, the transmit requests to consume bits (e.g., clock cycles) in the communication channel 160 are immediately reflected in the local count that indicates availability of the communication channel 160, but the processing (e.g., reads) release the bits (e.g., clock cycles) are only reflected in the capture count 415 indicating the availability after the requests cross the clock domain.

As illustrated in FIG. 9, at step 906, one or more of the systems described herein can transmit, in response to an approval, the communications 130 via the communication channel 160. In some implementations, in response to an approval, allocation controller 170 can transmit the communications 130 based on the conversion mode for the communication channel 160. In some implementations, the allocation controller 170 can convert, according to a conversion mode for the channel, the communications 130 from the first bit width (e.g., 256) to a second bit width (e.g., 128) in the channel of the communication channel 160. In some implementations, the conversion mode is set according to registers in the adapter 150. The synchronous circuits can read the communications 130 in the second bit width from the channel of the communication channel 160.

While an example has been provided in which the same counters (e.g., local count 405 and capture count 415) are used for all communications 130, in other embodiments there may be separate counts for different types of communications 130, which may be any number of different types of communications 130. In some implementations, the local count 405 includes one or more counters that are each associated with a respective type of the communications 130. For example, local count 405 can include a type-field that is used to track each type of the communications 130 in its own respective count. In some implementations, the capture count 415 includes one or more counters that are each associated with a respective type of the communications 130. For example, the capture count 415 includes one or more counters that each correspond to one of the one or more types of communications 130.

In some implementations, the synchronous circuit 110B can identify a type of the communications 130. For example, the synchronous circuit 110B can identify a type-field of each of the communications 130. In some implementations, the synchronous circuit 110B can track (e.g., count) each type of the communications 130 in their respective counters. The synchronous circuit 110B can use the valid 416 signal and the ready 417 signal as described herein to synchronize the one or more counters of the local count 405 across the clock domain with their respective one or more counters of the capture count 415 of the synchronous circuit 110A. The synchronous circuit 110A can manage (e.g., synchronize) the capture count 415 to track the type of the communications 130 processed by the synchronous circuit 110B during each clock cycle. In some implementations, the synchronous circuit 110A can determine whether to approve the transmit request based on the type of the communications 130. For example, after identifying the type of the communications 130, the synchronous circuit 110A can identify the counter of the capture count 415 that corresponds to the identified type. The synchronous circuit 110A can subtract the local count from the identified counter of the capture count 415 to determine whether the communications 130 of the specific type can be transmitted to the synchronous circuit 110B. For example, if the result is positive, then the communications 130 of the identified type can be transmitted. Conversely, if the result is negative, then the communications 130 of the identified type can be held until the synchronous circuit 110B processes communications 130 of that type, which can be detected by the synchronous circuit 110A after that type's counter of the capture count 415 is synchronized with that type's counter of the local count 405.

Figure 10:
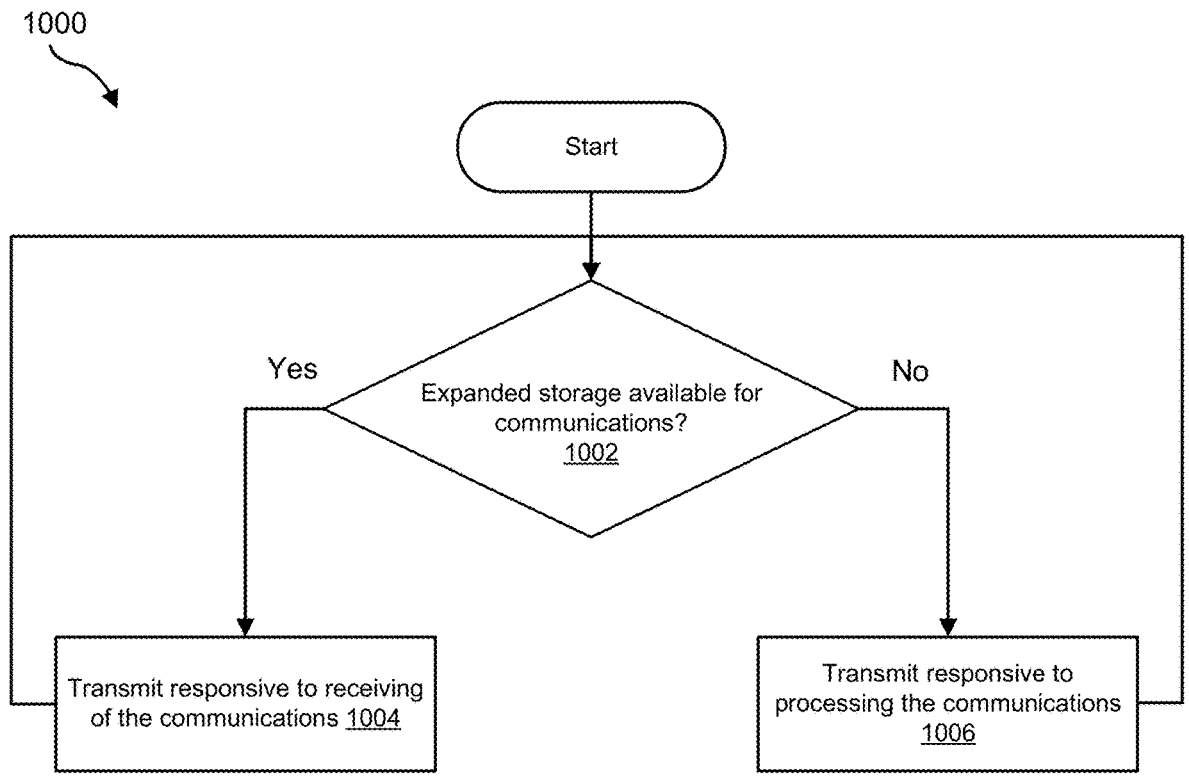
FIG. 10 is a flow diagram of another example method for managing channel accessibility.

FIG. 10 is a flow diagram of an example computer-implemented method 1000 for managing channel availability. The steps shown in FIG. 10 can be performed by all the components and devices illustrated in FIGS. 1-8. In one example, each of the steps shown in FIG. 10 can represent an algorithm whose structure includes and/or is represented by multiple sub-steps, examples of which will be provided in greater detail below.

As illustrated in FIG. 10, at step 1002, one or more of the systems described herein can determine whether the expanded memory is available for the communications 130. For example, the synchronous circuit 110B can, as part of system 100 in FIG. 1, determine whether the expanded count 418 representing expanded memory exceeds the capacity of the communication channel 160. The systems described herein can perform step 1002 in a variety of ways. In one example, the synchronous circuit 110B can initialize the local count 405 based on a buffer capacity (e.g., 10-bits) of the synchronous circuit 110B for processing the communications 130 transmitted by the synchronous circuit 110A to the synchronous circuit 110B over the communication channel 160. The synchronous circuit 110B can initialize the expanded count 418 based on a processing capacity of the synchronous circuit 110B for processing of the communications 130 transmitted from the synchronous circuit 110A.

The synchronous circuit 110B can compare the local count 405 to the expanded count 418. If the comparison indicates that the storage is available, the synchronous circuit 110B can immediately set the hold count 410 based on the expanded count 418 and synchronize the hold count 410 with the synchronous circuit 110A (e.g., to indicate the available clock cycles). If the comparison indicates that the storage is not available, the synchronous circuit 110B can set the hold count 410 based on the local count 405 and synchronize the hold count 410 with the synchronous circuit 110A (e.g., to avoid indicating available clock cycles until the clock cycles are released. Either way, the synchronous circuit 110B can synchronize the local count 405 (e.g., available clock cycles) to the synchronous circuit 110A that does not have to identify whether the clock cycles are available because of the expanded memory represented by the expanded count 418.

As illustrated in FIG. 10, at step 1004, if the expanded memory is available, the synchronous circuit 110B can synchronize the hold count 410 to the synchronous circuit 110A responsive to each receipt of the communications 130 from the first circuit. For example, when processing (e.g., writing) the communications 130, the synchronous circuit 110B can identify that the expanded memory is available if the local count 405 is greater than the expanded count 418. When the expanded memory is available, the synchronous circuit 110B can quickly release the clock cycles upon receipt of the communications 130. For example, the synchronous circuit 110B can increment the expanded count 418. In some implementations, the synchronous circuit 110B can increment the expanded count 418 by the number of the clock cycles necessary for processing the communications 130.

In some implementations, if the synchronous circuit 110B identifies that the local count 405 is greater than the expanded count 418, then the synchronous circuit 110B can count clock cycles as available for processing communications 130 via the communication channel 160 until their consumption (e.g., by a transmit request). In some implementations, the synchronous circuit 110B can increment the expanded count 418 responsive to identifying that a maximum number of the expanded count 418 for the communication channel 160 does not satisfy (e.g., is less than) a difference between a maximum number of the expanded count 418 for the expanded memory and a current number of the expanded count 418. For example, if more than 64 of the 256 clock cycles of expanded memory are available when the communication channel 160 is allocated 64 clock cycles, then the synchronous circuit 110B can count the clock cycles as available for processing the communications 130 to the communication channel 160 until their consumption by a transmit request. The computer-implemented method 1000 can proceed to step 1002 to continue comparing the expanded count 418 to the local count 405 as additional communications are received and processed.

As illustrated in FIG. 10, at step 1006, if the expanded memory is not available, the synchronous circuit 110B increment the expanded count 418 responsive to processing of at least one of the communications 130 from the available storage for the communications 130. For example, the synchronous circuit 110B can, as part of system 100 in FIG. 1, determine that there is less memory available in the expanded count 418 than in the processing capacity of the communication channel 160. The systems described herein can perform step 1006 in a variety of ways.

In some implementations, the synchronous circuit 110B can determine, based on the expanded count 418, that the expanded memory is unavailable as a reserve. In some implementations, after identifying that the expanded memory is unavailable, the synchronous circuit 110B can increment the expanded count 418 only after the communications 130 are processed. For example, after the expanded count 418 is incremented to equal the local count 405, the synchronous circuit 110B can count the clock cycles as available for processing the communications only when the clock cycles are released by processing the communications 130 by the synchronous circuit 110B. In some implementations, by performing the handshake with the local count 405, the synchronous circuit 110B can increment the expanded count 418 in a subsequent clock cycle to ensure that the clock cycles are available. The synchronous circuit 110B can increment the expanded count 418 by the number of the one or more clock cycles requested.

In some implementations, when the synchronous circuit 110B is processing (e.g., reading) the communications 130, the synchronous circuit 110B can identify whether the processing capacity for processing the communications 130 is greater than a difference between the capture count 415 and the local number of clock cycles used for processing (e.g., writing). For example, if the difference is 60 and thus less than the processing capacity of 255 clock cycles, the synchronous circuit 110B can modify (e.g., increment) the expanded count 418. In some implementations, if the difference is equal to or more than the processing capacity, then the synchronous circuit 110B can count clock cycles as available for the communication channel 160 only when the clock cycle is released for processing of the communications 130. For example, if the difference is equal to or more than the processing capacity of 255 clock cycles, then the processing capacity has been fully utilized and advertised to the synchronous circuit 110A, so the clock cycles do not count as released until the communications 130 are received and processed by the synchronous circuit 110B. In some implementations, if during the same clock cycle, the synchronous circuit 110A writes the communications 130 and the synchronous circuit 110B reads the communications 130, the expanded count 418 can be modified (e.g., incremented) if either (i) the expanded count 418 is less than the capture count 415 or (ii) the processing capacity for processing the communications 130 is greater than a difference between the capture count 415 and the local number of clock cycles used for processing. The computer-implemented method 1000 can proceed to step 1002 to compare the expanded count 418 to the local count 405, and after the expanded count 418 is greater than the local count 405 as discussed in step 1004, then the synchronous circuit 110B can again count clock cycles as available until they are consumed by the transmit request.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of system 100 in FIG. 1 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In various implementations, all, or a portion of system 100 in FIG. 1 can facilitate multi-tenancy within a cloud-based computing environment. In other words, the modules described herein can configure a computing system (e.g., a server) to facilitate multi-tenancy for one or more of the functions described herein. For example, one or more of the modules described herein can program a server to enable two or more clients (e.g., customers) to share an application that is running on the server. A server programmed in this manner can share an application, operating system, processing system, and/or storage system among multiple customers (i.e., tenants). One or more of the modules described herein can also partition data and/or configuration information of a multi-tenant application for each customer such that one customer cannot access data and/or configuration information of another customer.

According to various implementations, all or a portion of system 100 in FIG. 1 can be implemented within a virtual environment. For example, the modules and/or data described herein can reside and/or execute within a virtual machine. As used herein, the term "virtual machine" generally refers to any operating system environment that is abstracted from computing hardware by a virtual machine manager (e.g., a hypervisor).

In some examples, all or a portion of system 100 in FIG. 1 can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the computer-readable media used to carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various implementations of the examples disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing channel accessibility, the computer-implemented method comprising:
    detecting, by a first circuit, a transmit request from the first circuit to transmit a message into a communication channel connecting the first circuit to a second circuit; and
    transmitting, by the first circuit, the message into the communication channel based on an evaluation of a first number associated with messages previously transmitted by the first circuit to the second circuit over the communication channel and a second number associated with processing by the second circuit of the messages previously transmitted by the first circuit.

2. The computer-implemented method of claim 1, wherein the first number and the second number are binary values, and wherein the evaluation comprises subtracting the first number from the second number.

3. The computer-implemented method of claim 1, wherein the message is to be transmitted into the communication channel over a third number of clock cycles, and wherein the evaluation comprises comparing the third number of clock cycles to a difference between the first number and the second number.

4. The computer-implemented method of claim 3, wherein the transmit request is approved if the difference is greater than the third number of clock cycles.

5. The computer-implemented method of claim 3, wherein if the difference is less than the third number of clock cycles, the computer-implemented method further comprises:
    holding, by the first circuit, the transmit request;
    receiving, by the first circuit, an update to the second number associated with processing by the second circuit of the messages previously transmitted by the first circuit; and
    approving, by the first circuit, the transmit request responsive to the difference between the first number and the second number being greater than the third number of clock cycles.

6. The computer-implemented method of claim 1, further comprising:
    receiving, by the first circuit, the second number having a value corresponding to a processing capacity of the second circuit for processing of the messages from the first circuit; and
    receiving, by the first circuit, updates to the second number from the second circuit that processes the messages previously transmitted by the first circuit.

7. The computer-implemented method of claim 1, wherein the first number and the second number are associated with a processing capacity of the second circuit.

8. The computer-implemented method of claim 1, further comprising:
    incrementing, by the first circuit, the first number for each of the messages previously transmitted by the first circuit to the second circuit over the communication channel.

9. The computer-implemented method of claim 1, wherein:
    prior to processing of the messages previously transmitted by the first circuit, the second number is initialized, by the second circuit, to a value corresponding to a processing capacity of the second circuit for processing of the messages from the first circuit.

10. The computer-implemented method of claim 1, further comprising:
    receiving, by the first circuit, the second number from the second circuit.

11. The computer-implemented method of claim 10, wherein:
    the second number that is transmitted to the first circuit responsive to each receipt of the messages from the first circuit is incremented, by the second circuit, responsive to determining that available storage for messages satisfies a threshold.

12. The computer-implemented method of claim 11, wherein:

the second number that is transmitted to the first circuit responsive to processing of at least one of the messages from the available storage for the messages is incremented, by the second circuit, responsive to determining that the available storage for the messages does not satisfy the threshold.

13. The computer-implemented method of claim 1, wherein the first number comprises one or more first numbers that are each associated with a respective type of the messages transmitted by the first circuit, wherein the second number comprises one or more second numbers that each correspond to one of the one or more first numbers, and further comprising:
   identifying, by the first circuit, a type of the message associated with the transmit request; and
   approving, by the first circuit, the transmit request based on the type of the message.

14. A system for managing channel accessibility, the system comprising:
   a first circuit arranged to:
      detect a transmit request from the first circuit to transmit a message into a communication channel connecting the first circuit to a second circuit; and
      transmit the message into the communication channel based on an evaluation of a first number associated with messages previously transmitted by the first circuit to the second circuit over the communication channel and a second number associated with processing by the second circuit of the messages previously transmitted by the first circuit.

15. The system of claim 14, wherein the first number and the second number are binary values, and wherein the evaluation comprises subtracting the first number from the second number.

16. The system of claim 14, wherein the message is to be transmitted into the communication channel over a third number of clock cycles, and wherein the evaluation comprises comparing the third number of clock cycles to a difference between the first number and the second number.

17. The system of claim 16, wherein the transmit request is approved if the difference is greater than the third number of clock cycles.

18. The system of claim 16, wherein if the difference is less than the third number of clock cycles, the first circuit is further arranged to:
   hold the transmit request;
   receive an update to the second number associated with processing by the second circuit of the messages previously transmitted by the first circuit; and
   approve the transmit request responsive to the difference between the first number and the second number being greater than the third number of clock cycles.

19. The system of claim 14, wherein the first circuit is further arranged to:
   receive the second number having a value corresponding to a processing capacity of the second circuit for processing of the messages from the first circuit; and
   receive updates to the second number from the second circuit responsive to the second circuit processing the messages previously transmitted by the first circuit.

20. A non-transitory computer-readable medium comprising one or more computer-executable instructions that, when executed by a first circuit, cause the first circuit to:
   detect a transmit request from the first circuit to transmit a message into a communication channel connecting the first circuit to a second circuit; and
   transmit the message into the communication channel based on an evaluation of a first number associated with messages previously transmitted by the first circuit to the second circuit over the communication channel and a second number associated with processing by the second circuit of the messages previously transmitted by the first circuit.

* * * * *